(12) United States Patent
Jeon (10) Patent No.: US 11,874,744 B2
(45) Date of Patent: Jan. 16, 2024

(54) MOBILE PHONE HAVING FLASH MEMORY RESET FUNCTION AND FLASH MEMORY CONTROL APPARATUS THEREOF

(71) Applicant: Silicon Works Co., Ltd., Daejeon (KR)

(72) Inventor: Myung Kyu Jeon, Daejeon (KR)

(73) Assignee: Silicon Works Co., Ltd., Daejeon (KR)

( * ) Notice: Subject to any disclaimer, the term of this patent is extended or adjusted under 35 U.S.C. 154(b) by 11 days.

(21) Appl. No.: 17/460,000

(22) Filed: Aug. 27, 2021

(65) Prior Publication Data

US 2022/0066881 A1 Mar. 3, 2022

(30) Foreign Application Priority Data

Aug. 31, 2020 (KR) .................. 10-2020-0110025

(51) Int. Cl.
*G06F 11/14* (2006.01)
*G06F 11/07* (2006.01)
*G06F 3/06* (2006.01)

(52) U.S. Cl.
CPC ........ *G06F 11/1441* (2013.01); *G06F 11/076* (2013.01); *G06F 11/0742* (2013.01); *G06F 11/0793* (2013.01); *G06F 11/141* (2013.01); *G06F 3/0679* (2013.01); *G06F 2201/82* (2013.01); *H04M 2201/36* (2013.01); *H04M 2250/22* (2013.01)

(58) Field of Classification Search
CPC ............. G06F 11/1441; G06F 11/0742; G06F 11/076; G06F 11/0793; G06F 11/141; G06F 3/0679; G06F 2201/82; G06F 3/061; G06F 3/0629; G06F 3/0416; H04M 2201/36; H04M 2250/22; H04M 1/0277; H04M 1/0266; H04M 1/72454; H04M 1/72469; H04M 2201/34; G11C 16/20; G11C 16/26

See application file for complete search history.

(56) References Cited

U.S. PATENT DOCUMENTS

| | | | |
|---|---|---|---|
| 2015/0317198 A1* | 11/2015 | Kume | G06F 11/073 |
| | | | 714/6.11 |
| 2015/0355845 A1* | 12/2015 | Lee | G06F 3/0659 |
| | | | 711/103 |
| 2019/0258539 A1* | 8/2019 | Zhu | G06F 13/1668 |
| 2020/0042452 A1* | 2/2020 | Palmer | G06F 11/1441 |

(Continued)

FOREIGN PATENT DOCUMENTS

| JP | 2014-115950 A | 6/2014 |
|---|---|---|
| KR | 2015-0140496 A | 12/2015 |
| KR | 2018-0003973 A | 1/2018 |

*Primary Examiner* — Bryce P Bonzo
*Assistant Examiner* — Michael Xu
(74) *Attorney, Agent, or Firm* — POLSINELLI PC (57) ABSTRACT

A mobile phone having a flash memory reset function, which solves a malfunction of the mobile phone due to an abnormal state of a flash memory, and a flash memory control apparatus thereof. The flash memory control apparatus includes an application processor configured to provide the hold signal and the chip select signal for resetting when it is determined, on the basis of error information due to a read error of an integrated circuit operating by reading flash data, that an abnormal case due to a read error for the flash data has occurred more than a predetermined number of times; and a flash memory configured to reset the flash data when the hold signal and the chip select signal for resetting are received.

17 Claims, 3 Drawing Sheets

(56) References Cited

U.S. PATENT DOCUMENTS

| | | | | |
|---|---|---|---|---|
| 2020/0202953 A1* | 6/2020 | Oh | .................... | G11C 13/0035 |
| 2021/0019217 A1* | 1/2021 | Zhu | .................... | G06F 11/3037 |
| 2021/0279169 A1* | 9/2021 | Zhang | ................ | G06F 9/44505 |
| 2021/0311830 A1* | 10/2021 | Lee | ....................... | G11C 29/52 |

\* cited by examiner

MOBILE PHONE HAVING FLASH MEMORY RESET FUNCTION AND FLASH MEMORY CONTROL APPARATUS THEREOF

BACKGROUND

1. Technical Field

Various embodiments generally relate to control of a flash memory, and more particularly, to a mobile phone having a flash memory reset function, which solves a malfunction of the mobile phone due to an abnormal state of a flash memory, and a flash memory control apparatus thereof.

2. Related Art

Recently, a mobile phone is fabricated to execute a call or an application, and is configured to display various information regarding the call or the application through a screen and to execute control of the call or the application through a touch of the screen.

To this end, the mobile phone includes a display touch panel which has both a display function and a touch sensing function of the screen.

The display touch panel refers to a panel in which the screen is configured to have a display function and a touch sensing function.

For example, the display touch panel may be configured such that elements configuring a display panel and elements configuring a touch panel are partially shared. Such a panel may be referred to as an in-cell type display touch panel.

The mobile phone may include a touch integrated circuit which is coupled to the display touch panel. The touch integrated circuit may be configured to provide a touch driving signal for sensing a touch, to the display touch panel, and to receive a touch sensing signal having sensed a touch, from the display touch panel.

The mobile phone may further include a display integrated circuit which is coupled to the display touch panel. The display integrated circuit may be configured to provide a source signal for the display of the screen, to the display touch panel, and to receive a pixel sensing signal having sensed a characteristic of a pixel, from the display touch panel.

The mobile phone further includes a flash memory for providing firmware and flash data to at least one of the display integrated circuit and the touch integrated circuit.

The display integrated circuit needs to be configured to perform Demura for eliminating Mura on the screen. To this end, the flash memory may be configured to store a correction value for the Demura, as the flash data, and to provide the flash data for the Demura, in response to reading by the display integrated circuit.

The touch integrated circuit is configured to use the flash data of the flash memory which stores touch firmware, at a booting time or a display-on time of the mobile phone. To this end, the flash memory may be configured to store the flash data for the operation of the touch integrated circuit and to provide the flash data in response to reading by the touch integrated circuit.

In general, the display integrated circuit or the touch integrated circuit may abnormally read the flash data of the flash memory due to the influence of electrostatic discharge (ESD).

In this case, the display integrated circuit or the touch integrated circuit may malfunction due to the abnormal reading of the flash data.

A read error for the flash data due to electrostatic discharge may be generally solved by detaching and then attaching a battery of the mobile phone or turning off and then turning on main power.

However, solving, in this way, the read error for the flash data may cause considerable inconvenience to a user and may degrade the reliability of a product.

Therefore, there is a need to develop a technology capable of stably solving a read error for flash data without causing inconvenience to a user who uses a mobile phone.

SUMMARY

Various embodiments are directed to providing a flash memory control apparatus capable of easily resetting flash data of a flash memory when a read error for the flash data of the flash memory occurs.

Also, various embodiments are directed to providing a mobile phone having a flash memory reset function capable of easily resetting flash data of a flash memory when a read error of a touch integrated circuit for the flash data of the flash memory occurs.

Further, various embodiments are directed to providing a mobile phone having a flash memory reset function capable of easily resetting flash data of a flash memory when a read error of a display integrated circuit for the flash data of the flash memory occurs.

In an embodiment, a flash memory control apparatus may include: a flash memory configured to receive a hold signal and a chip select signal, and store and provide flash data; and an application processor configured to provide the hold signal and the chip select signal for resetting when it is determined, on the basis of error information, that an abnormal case due to a read error for the flash data has occurred more than a predetermined number of times, wherein the flash memory resets the flash data by the hold signal and the chip select signal for resetting.

In an embodiment, a mobile phone having a flash memory reset function may include: a display touch panel configured to perform display and sensing of a touch; a touch integrated circuit configured to read flash data, provide a touch driving signal for sensing of the touch to the display touch panel by using the flash data, receive a touch sensing signal having sensed the touch, and provide error information due to a read error for the flash data; a flash memory configured to receive a hold signal and a chip select signal, store the flash data, and provide the flash data to the touch integrated circuit; and an application processor configured to provide the hold signal and the chip select signal for resetting when it is determined, on the basis of the error information, that an abnormal case due to a read error for the flash data has occurred more than a predetermined number of times, wherein the flash memory resets the flash data when the hold signal and the chip select signal for resetting are received.

In an embodiment, a mobile phone having a flash memory reset function may include: a display touch panel configured to perform display and sensing of a touch; a display integrated circuit configured to read flash data, provide a source signal for display to the display touch panel by using the flash data, and provide error information due to a read error for the flash data; a flash memory configured to receive a hold signal and a chip select signal, store the flash data, and provide the flash data to the display integrated circuit; and an application processor configured to provide the hold signal and the chip select signal for resetting when it is determined, on the basis of the error information, that an abnormal case due to a read error for the flash data has occurred more than a predetermined number of times, wherein the flash memory resets the flash data when the hold signal and the chip select signal for resetting are received.

According to the embodiments of the present disclosure, when an abnormal case due to a read error for flash data occurs more than a predetermined number of times, the flash memory control apparatus may reset the flash data of a flash memory by using a hold signal and a chip select signal, thereby easily resetting the flash data in response to the abnormal case.

Also, according to the embodiments of the present disclosure, when an abnormal case due to a read error of a display integrated circuit or a touch integrated circuit of a mobile phone for flash data occurs more than a predetermined number of times, the flash data of a flash memory may be reset by using a hold signal and a chip select signal, whereby it is possible to easily solve a malfunction of the mobile phone in response to the abnormal case.

Therefore, according to the embodiments of the present disclosure, the mobile phone may easily solve a malfunction in response to an abnormal case due to a read error for flash data, whereby it is possible to achieve improved reliability of a product.

DETAILED DESCRIPTION

Figure 1:
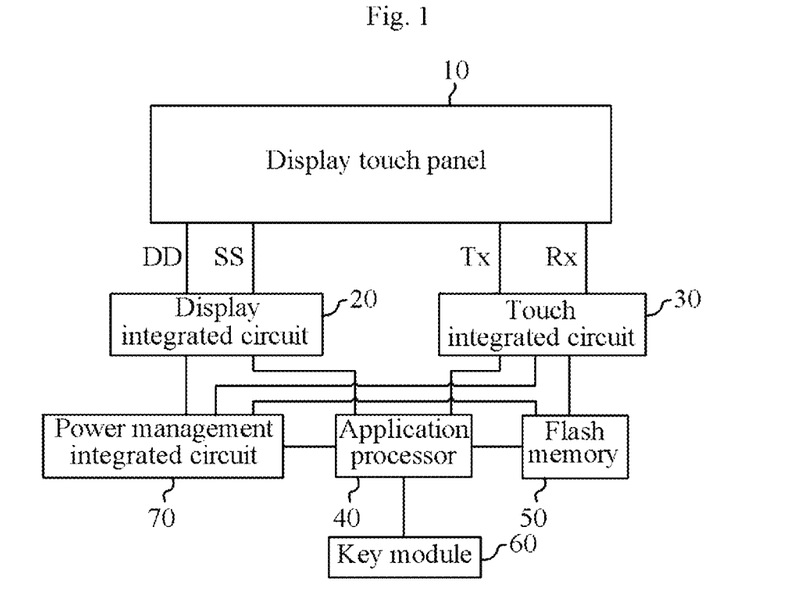
FIG. 1 is a block diagram illustrating a mobile phone having a flash memory reset function in accordance with an embodiment.

A mobile phone having a flash memory reset function in accordance with an embodiment of the present disclosure may be configured as illustrated in FIG. 1.

Referring to FIG. 1, the mobile phone may include a display touch panel 10, a display integrated circuit 20, a touch integrated circuit 30, an application processor 40, a flash memory 50, a key module 60 and a power management integrated circuit 70.

Among these components, the application processor 40 and the power management integrated circuit 70 may be configured as one integrated circuit according to a fabricator's need. The key module 60 may be implemented by a button which is electrically interfaced with the application processor 40. However, according to the fabricator's intention, the key module 60 may be configured in a touch type to provide a key signal by a touch.

The display touch panel 10 is for the display of a screen and for sensing a touch by a user. To this end, the display touch panel 10 forms the screen of the mobile phone, and is configured to implement a display function and a touch function.

The display touch panel 10 may be configured to implement the display function using organic light emitting diodes (OLEDs) or liquid crystals (LCs). As an embodiment of the present disclosure, the display touch panel 10 is exemplified as implementing the display function by forming pixels using the OLEDs. In the embodiment of the present disclosure, the pixels for implementing the display function of the display touch panel 10 and patterns for implementing the touch function of the display touch panel 10 may be variously embodied, and thus, detailed description thereof will be omitted.

The display integrated circuit 20 is configured to receive display data (not illustrated) provided from an external source such as a timing controller (not illustrated), generate a source signal DD corresponding to the display data, and provide the source signal DD to the display touch panel 10.

The display touch panel 10 has a large number of channels for supporting a size and a resolution of the screen, and the display integrated circuit 20 is configured to provide the source signal DD corresponding to each channel of the display touch panel 10.

The brightness of each OLED forming each pixel of the display touch panel 10 may be changed by degradation. In order to compensate for this, the display integrated circuit 20 is configured to receive a pixel sensing signal SS for sensing the characteristic of the pixel, for each channel of the display touch panel 10.

The display integrated circuit 20 may be configured to compensate display data according to the degree of degradation of the pixel, by using the received pixel sensing signal SS, and to provide the source signal DD corresponding to the compensated display data, for each channel of the display touch panel 10.

The display touch panel 10 may be configured to have the touch function by sensing a touch, for example, capacitively. The display touch panel 10 may be implemented in an in-cell type in which some of components for touch are shared with a configuration for display.

In order to perform the touch function, the touch integrated circuit 30 is configured to provide a touch driving signal Tx for sensing a touch, to the display touch panel 10, and receive a touch sensing signal Rx having sensed a touch.

The touch integrated circuit 30 is configured to use flash data of the flash memory 50 which stores touch firmware, at a booting time or a display-on time of the mobile phone.

Therefore, the touch integrated circuit 30 is configured to read the flash data at the booting time or the display-on time of the mobile phone, provide the touch driving signal Tx for sensing a touch, to the display touch panel 10, by using the flash data, and receive the touch sensing signal Rx having sensed a touch, from the display touch panel 10.

The touch integrated circuit 30 is configured to, when a read error for the flash data occurs because electrostatic discharge (ESD) exerts an influence on the flash memory 50, provide error information due to the read error, to the application processor 40.

The flash memory 50 may be configured to store touch firmware and the flash data for the operation of the touch integrated circuit 30 and provide the flash data in response to reading by the touch integrated circuit 30.

The application processor 40 may synchronize display and touch by being interfaced with the display integrated circuit 20 and the touch integrated circuit 30.

The application processor 40 receives error information due to a read error, from the touch integrated circuit 30, and when it is determined, on the basis of the error information, that an abnormal case due to a read error for the flash data has occurred more than a predetermined number of times, controls the flash memory 50 such that the flash memory 50 performs a reset operation.

For example, the application processor 40 may be configured to provide an enabled hold signal HOLD # and a disabled chip select signal CS # for resetting, to the flash memory 50, in order to allow the flash memory 50 to perform the reset operation. The hold signal HOLD # and the chip select signal CS # will be described later with reference to FIGS. 2 and 3.

The flash memory 50 receives the hold signal HOLD # and the chip select signal CS # and performs the reset operation. The reset operation will be described later with reference to FIG. 4.

The operation of the application processor 40 may be interfaced with the key module 60 described above, and may be controlled in response to a user's manipulation using the key module 60.

The display integrated circuit 20, the touch integrated circuit 30, the application processor 40 and the flash memory 50 described above require the same or different power for the operations thereof, and the power may be provided from the power management integrated circuit 70.

The power management integrated circuit 70 may provide various levels of voltages for analog processes and voltages for digital processes, by using external power.

In the above description, the application processor 40 and the flash memory 50 may be understood as a flash memory control apparatus in accordance with an embodiment of the present disclosure.

Figure 2:
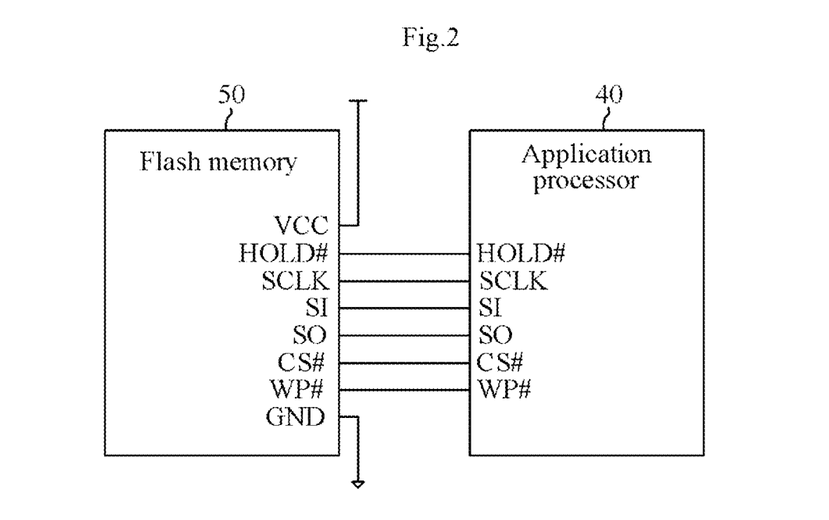
FIG. 2 is a block diagram illustrating a flash memory control apparatus in accordance with an embodiment, applied to the mobile phone of FIG. 1.

The application processor 40 and the flash memory 50 may be configured to be interfaced as illustrated in FIG. 2.

In FIG. 2, the application processor 40 includes a hold signal terminal which provides the hold signal HOLD #, a chip select signal terminal which provides the chip select signal CS #, a serial clock signal terminal which provides a serial clock signal SCLK, a serial input signal terminal which provides a serial input signal SI, a serial output signal terminal which receives a serial output signal SO, and a write protection signal terminal which provides a write protection signal WP #.

In FIG. 2, the flash memory 50 includes a power terminal to which an operating voltage VCC is applied, a hold signal terminal which receives the hold signal HOLD #, a chip select signal terminal which receives the chip select signal CS #, a serial clock signal terminal which receives the serial clock signal SCLK, a serial input signal terminal which receives the serial input signal SI, a serial output signal terminal which provides the serial output signal SO, a write protection signal terminal which receives the write protection signal WP #, and a ground terminal to which a ground voltage GDN is applied.

In FIG. 2, in the application processor 40 and the flash memory 50, the hold signal terminals for the hold signal HOLD #, the chip select signal terminals for the chip select signal CS #, the serial clock signal terminals for the serial clock signal SCLK, the serial input signal terminals for the serial input signal SI, the serial output signal terminals for the serial output signal SO and the write protection signal terminals for the write protection signal WP # are interfaced to be connected with each other for signal transfer.

In FIG. 2, the hold signal terminal of the flash memory 50 is configured to be applied with a signal of a level corresponding to the enable or disable of the hold signal HOLD #.

In FIG. 2, the hold signal HOLD #, the chip select signal CS # and the write protection signal WP # are provided to have a high level for disable and a low level for enable.

The hold signal HOLD # maintains a high level deactivated state in a normal state, and transitions to a low level activated state for the reset operation. The chip select signal CS # maintains a high level deactivated state when an access to the flash memory 50 is not necessary, and transitions to a low level activated state at a time when an access to the flash memory 50 is necessary to reset the flash data. The serial clock signal SCLK is provided to have a pulse waveform which toggles with a preset frequency in order to recognize the serial input signal SI and the serial output signal SO. The serial input signal SI may be understood as a signal corresponding to a command for controlling the flash memory 50 by the application processor 40, and the serial output signal SO may be understood as an output signal of the flash data corresponding to the serial input signal SI. The write protection signal WP # may be activated to a low level to prevent write to the flash data, and may be deactivated to a high level to allow write to the flash data.

Among these signals, for the reset operation, the hold signal HOLD # transitions to a low level activated state, and the chip select signal CS # transitions to a high level deactivated state.

Figure 3:
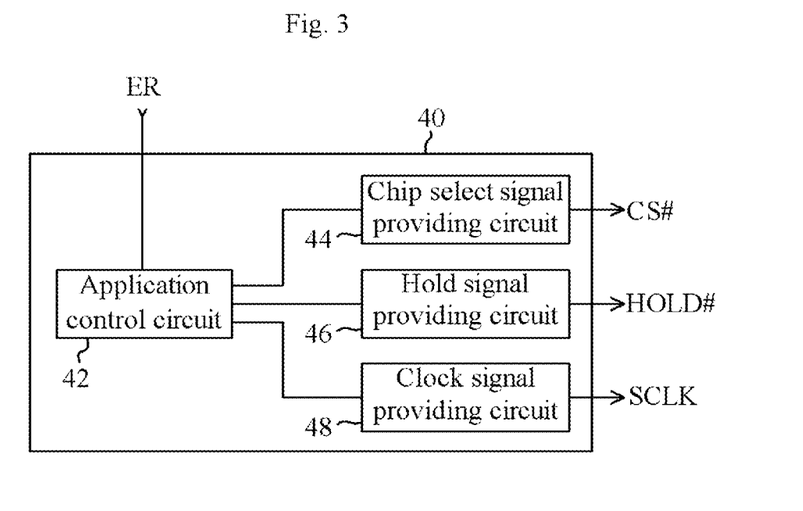
FIG. 3 is a detailed block diagram of an application processor of FIG. 2.

To this end, the application processor 40 may be configured as illustrated in FIG. 3.

Referring to FIG. 3, the application processor 40 is configured to receive error information ER due to a read error, provided from the touch integrated circuit 30, and output the activated hold signal HOLD # and the deactivated chip select signal CS # for controlling the flash memory 50 such that the flash memory 50 performs the reset operation for resetting.

To this end, the application processor 40 is exemplified as including an application control circuit 42, a chip select signal providing circuit 44, a hold signal providing circuit 46 and a clock signal providing circuit 48.

The application control circuit 42 is configured to receive the error information ER, determine, on the basis of the error information ER, whether an abnormal case due to a read error for the flash data has occurred more than the predetermined number of times, and provide control signals according to a result of the determination to the chip select signal providing circuit 44, the hold signal providing circuit 46 and the clock signal providing circuit 48.

The hold signal providing circuit 46 is configured to provide, in a normal state, the hold signal HOLD # which is disabled to a high level, and provide, when the control signal according to the determination that an abnormal case due to a read error for the flash data has occurred more than the predetermined number of times is received from the application control circuit 42, the hold signal HOLD # which transitions to a low level and is thus enabled for resetting.

The chip select signal providing circuit 44 is configured to provide, when an access to the flash memory 50 is not necessary, the chip select signal CS # which is disabled to a high level, and provide, when an access to the flash memory 50 is necessary, the chip select signal CS # which is enabled to a low level. The chip select signal providing circuit 44 is configured to provide, when the control signal according to the determination that an abnormal case due to a read error for the flash data has occurred more than the predetermined number of times is received from the application control circuit 42 while providing the chip select signal CS # which is enabled to a low level due to the necessity of an access, the chip select signal CS # which transitions to a high level and maintains disable for a predetermined time, for the reset of the flash data.

It may be understood that the clock signal providing circuit 48 provides the serial clock signal SCLK under the control of the application control circuit 42 and generates and provides the serial clock signal SCLK on the basis of a clock signal provided from the outside. When the control signal according to the determination that an abnormal case due to a read error for the flash data has occurred more than the predetermined number of times is received from the application control circuit 42, the clock signal providing circuit 48 may maintain or stop the generation of the serial clock signal SCLK according to the fabricator's intention. Since the serial clock signal SCLK is not involved in the reset of the flash data of the flash memory 50, it may be understood that the serial clock signal SCLK is irrelevant to the reset operation.

Although not illustrated in FIG. 3, since the serial input signal SI and the serial output signal SO are irrelevant to the reset operation, they may have levels corresponding to high impedance states in response to the reset operation.

Figure 4:
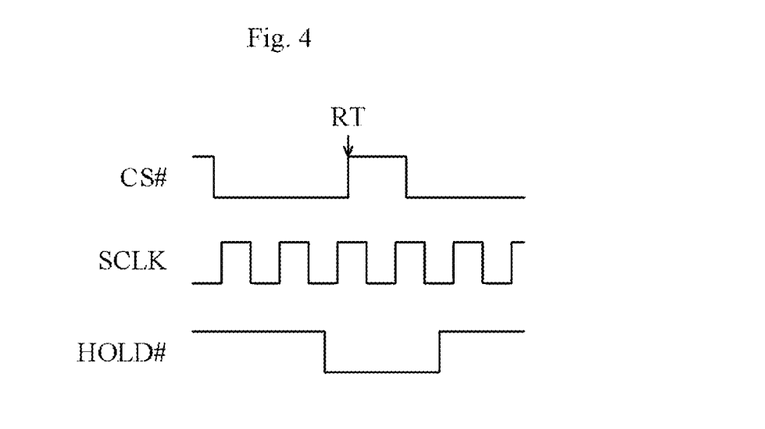
FIG. 4 is a waveform diagram illustrating a flash data reset method in accordance with an embodiment.

As the application processor 40 and the flash memory 50 are configured as illustrated in FIGS. 2 and 3, the reset operation may be performed as illustrated in FIG. 4.

Referring to FIG. 4, the reset operation for resetting the flash memory 50 may be entered when the hold signal HOLD # which is enabled to a low level is received. A period during which the reset operation is performed may be understood as a period during which the hold signal HOLD # maintains enable to a low level. When the chip select signal CS # is disabled to a high level for resetting, the flash memory 50 may perform the reset of the flash data. The flash memory 50 may perform the reset of the flash data at a time RT when the chip select signal CS # is disabled. In order for the reset of the flash data, the flash memory 50 may reset an internal logic which stores the flash data.

In the embodiment of FIGS. 1 to 4 described above, when there is no error because the flash data read from the flash memory 50 by the touch integrated circuit 30 is not affected by electrostatic discharge, the touch integrated circuit 30 performs a normal operation of providing, by using the flash data, the touch driving signal Tx for sensing a touch to the display touch panel 10 and receiving the touch sensing signal Rx having sensed a touch.

At this time, since the error information ER due to a read error for the flash data is not received from the touch integrated circuit 30, the application processor 40 may maintain the hold signal HOLD # at a high level disable state, and may provide the chip select signal CS # at a low level enable state for an access to the flash memory 50. At this time, the flash memory 50 does not perform the reset of the flash data by the reset operation.

However, when there is an error because the flash data read from the flash memory 50 by the touch integrated circuit 30 is affected by electrostatic discharge, the touch integrated circuit 30 provides the error information ER due to a read error for the flash data to the application processor 40.

When receiving the error information ER due to a read error for the flash data, the application processor 40 determines, on the basis of the error information ER, whether an abnormal case due to a read error for the flash data has occurred more than the predetermined number of times.

When it is determined that an abnormal case due to a read error for the flash data has occurred more than the predetermined number of times, the application processor 40 may provide the hold signal HOLD # which is enabled and then provide the chip select signal CS # which maintains disable for the predetermined time, for resetting.

When the hold signal HOLD # which is enabled and the chip select signal CS # which is disabled are provided for resetting, the flash memory 50 neglects states of the serial clock signal SCLK, the serial input signal SI, the serial output signal SO and the write protection signal WP #, enters the reset operation by the enabled hold signal HOLD #, and resets the flash data at the time RT when the chip select signal CS # is disabled by transitioning to a high level.

According to the above description, the embodiment of the present disclosure may easily perform the reset of flash data in response to an abnormal case due to a read error for the flash data, and may easily solve a malfunction of the mobile phone.

Figure 5:
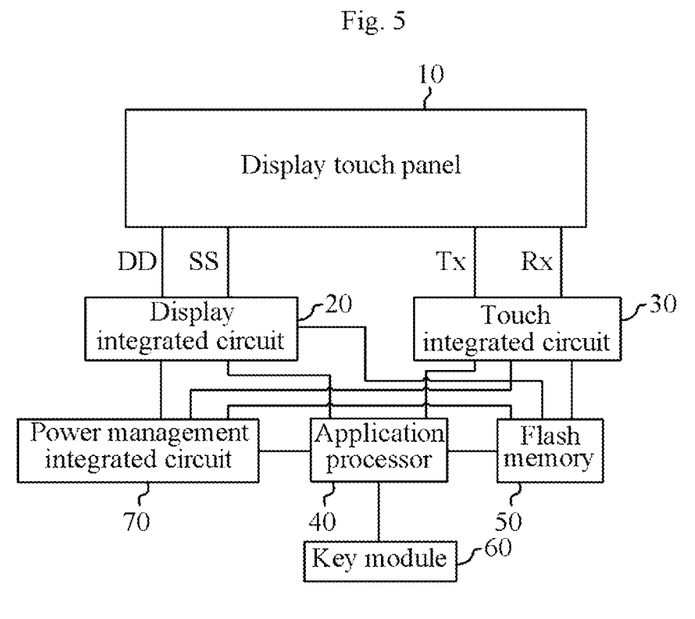
FIG. 5 is a block diagram illustrating a mobile phone having a flash memory reset function in accordance with another embodiment.

Meanwhile, the present disclosure may be embodied as illustrated in FIG. 5.

In FIG. 5, a display integrated circuit 20 is configured to read flash data, provide a source signal for display to a display touch panel 10 by using the flash data, and provide error information due to a read error for the flash data.

An application processor 40 is configured to receive the error information from the display integrated circuit 20, and provide a hold signal HOLD # and a chip select signal CS #.

A flash memory 50 is configured to receive the hold signal HOLD # and the chip select signal CS #, store the flash data, and provide the flash data to the display integrated circuit 20 in response to a read request of the display integrated circuit 20.

For example, the flash memory 50 may be configured to store a correction value for Demura, as the flash data, and provide the flash data for Demura, in response to reading by the display integrated circuit 20.

Even in the case of FIG. 5, when there is an error because the flash data read from the flash memory 50 by the display integrated circuit 20 is affected by electrostatic discharge, the display integrated circuit 20 provides error information ER due to a read error for the flash data to the application processor 40.

When receiving the error information ER due to a read error for the flash data, the application processor 40 determines, on the basis of the error information ER, whether an abnormal case due to a read error for the flash data has occurred more than a predetermined number of times.

When it is determined that an abnormal case due to a read error for the flash data has occurred more than the predetermined number of times, the application processor 40 may provide the hold signal HOLD # which is enabled and then provide the chip select signal CS # which maintains disable for a predetermined time, for resetting.

When the hold signal HOLD # which is enabled and the chip select signal CS # which is disabled are provided for resetting, the flash memory 50 neglects states of a serial clock signal SCLK, a serial input signal SI, a serial output signal SO and a write protection signal WP #, enters a reset operation by the enabled hold signal HOLD #, and resets the flash data at a time RT when the chip select signal CS # is disabled by transitioning to a high level.

In this case, the above operations of the application processor 40 and the flash memory 50 may be understood with reference to FIGS. 2 to 4.

Therefore, even in the case of FIG. 5, the embodiment of the present disclosure may easily perform the reset of flash data in response to an abnormal case due to a read error of the display integrated circuit 20 for the flash data, and may easily solve a malfunction of a mobile phone.

Therefore, according to the embodiments of the present disclosure, the mobile phone may easily solve a malfunction in response to an abnormal case due to a read error for flash data, whereby it is possible to achieve improved reliability of a product.

What is claimed is:

1. A flash memory control apparatus comprising:
a flash memory circuit including a first hold signal terminal for receiving a hold signal and a first chip select signal terminal for receiving a chip select signal, and configured to store and provide flash data; and
an application processor including a second hold signal terminal for providing the hold signal and a second chip select signal terminal for providing the chip select signal and configured to reset, when it is determined, on the basis of error information, that an abnormal case due to a read error for the flash data has occurred more than a predetermined number of times,
wherein the flash memory circuit resets the flash data by the hold signal and the chip select signal for resetting,
the flash memory circuit provides the flash data in response to a read request of a touch integrated circuit or a display integrated circuit, and
the application processor receives the error information on the read error for the flash data from the touch integrated circuit or the display integrated circuit.

2. The flash memory control apparatus according to claim 1, wherein the touch integrated circuit provides a touch driving signal for sensing a touch and receives a touch sensing signal having sensed the touch.

3. The flash memory control apparatus according to claim 1,
wherein the display integrated circuit provides a source signal for display.

4. The flash memory control apparatus according to claim 1, wherein the flash memory circuit resets an internal logic which stores the flash data, to reset the flash data.

5. The flash memory control apparatus according to claim 1,
wherein the flash memory circuit comprises a power terminal provided with an operating voltage;
wherein the hold signal is transferred by an interface between the first hold signal terminal and the second hold signal terminal, and
wherein the chip select signal is transferred by an interface between the first chip select signal terminal and the second chip select signal terminal.

6. The flash memory control apparatus according to claim 1, wherein the flash memory circuit performs reset of the flash data when the chip select signal for resetting is received after the hold signal for resetting is received.

7. A mobile phone having a flash memory reset function, comprising:
a display touch panel configured to perform display and sensing of a touch;
a touch integrated circuit configured to read flash data, provide a touch driving signal for sensing of the touch to the display touch panel by using the flash data, receive a touch sensing signal having sensed the touch, and provide error information due to a read error for the flash data;
a flash memory circuit including a first hold signal terminal for receiving a hold signal and a first chip select signal terminal for receiving a chip select signal and configured to store the flash data and provide the flash data to the touch integrated circuit; and
an application processor including a second hold signal terminal for providing the hold signal and a second chip select signal terminal for providing the chip select signal, wherein the application processor is configured to reset, it is determined, on the basis of the error information, that an abnormal case due to the read error for the flash data has occurred more than a predetermined number of times,
wherein the flash memory circuit resets the flash data when the hold signal and the chip select signal are received.

8. The mobile phone according to claim 7, wherein the flash memory circuit resets an internal logic which stores the flash data, to reset the flash data.

9. The mobile phone according to claim 7, wherein the flash memory circuit comprises a power terminal provided with an operating voltage;
wherein the hold signal is transferred by an interface between the first hold signal terminal and the second hold signal terminal, and
wherein the chip select signal is transferred by an interface between the first chip select signal terminal and the second chip select signal terminal.

10. The mobile phone according to claim 7, wherein the flash memory circuit performs reset of the flash data when the chip select signal for resetting is received after the hold signal for resetting is received.

11. A mobile phone having a flash memory reset function, comprising:
a display touch panel configured to perform display and sensing of a touch;
a display integrated circuit configured to read flash data, provide a source signal for display to the display touch panel by using the flash data, and provide error information due to a read error for the flash data;
a flash memory circuit including a first hold signal terminal for receiving a hold signal and a first chip select signal terminal for receiving a chip select signal, and configured to store the flash data, and provide the flash data to the display integrated circuit; and
an application processor including a second hold signal terminal for providing the hold signal and a second chip select signal terminal for providing the chip select signal, wherein the application processor is configured to reset, when it is determined, on the basis of the error information, that an abnormal case due to the read error for the flash data has occurred more than a predetermined number of times,
wherein the flash memory circuit resets the flash data when the hold signal and the chip select signal for resetting are received.

12. The mobile phone according to claim 11, wherein the flash memory circuit resets an internal logic which stores the flash data, to reset the flash data.

13. The mobile phone according to claim 11,
wherein the flash memory circuit comprises a power terminal provided with an operating voltage,
wherein the hold signal is transferred by an interface between the first hold signal terminal and the second hold signal terminal, and
wherein the chip select signal is transferred by an interface between the first chip select signal terminal and the second chip select signal terminal.

14. The mobile phone according to claim 11, wherein the flash memory circuit performs reset of the flash data when the chip select signal for resetting is received after the hold signal for resetting is received.

15. The flash memory control apparatus according to claim 1, wherein the application processor is configured to select the flash memory circuit using the chip select signal, enable holding control of the flash memory circuit using the hold signal, and reset the flash memory circuit by disabling the chip select signal while holding the flash memory circuit.

16. The mobile phone according to claim 7, wherein the application processor is configured to select the flash memory circuit using the chip select signal, enable holding control of the flash memory circuit using the hold signal, and reset the flash memory circuit by disabling the chip select signal while holding the flash memory circuit.

17. The mobile phone according to claim 11, wherein the application processor is configured to select the flash memory circuit using the chip select signal, enable holding control of the flash memory circuit using the hold signal, and reset the flash memory circuit by disabling the chip select signal while holding the flash memory circuit.

* * * * *